Nov. 23, 1965   R. M. STINCHFIELD   3,218,731
VACUUM FREEZE DRYER HAVING INTEGRAL FREEZING MEANS
Filed March 19, 1962   2 Sheets-Sheet 1

INVENTOR.
Roger M. Stinchfield
BY
Agent

Nov. 23, 1965 R. M. STINCHFIELD 3,218,731
VACUUM FREEZE DRYER HAVING INTEGRAL FREEZING MEANS
Filed March 19, 1962 2 Sheets-Sheet 2

INVENTOR.
Roger M. Stinchfield
BY
Agent

United States Patent Office 3,218,731
Patented Nov. 23, 1965

3,218,731
VACUUM FREEZE DRYER HAVING
INTEGRAL FREEZING MEANS
Roger M. Stinchfield, Reading, Mass., assignor to Arthur D. Little, Inc., Cambridge, Mass., a corporation of Massachusetts
Filed Mar. 19, 1962, Ser. No. 180,642
5 Claims. (Cl. 34—62)

This invention relates to process and apparatus for freeze-drying and particularly to a method of introducing feed material continuously to the vacuum chamber of a freeze dryer which utilizes a continuous surface for support and conveyance of the material during drying. It is particularly concerned with the continuous freeze-drying of foodstuffs in such a manner as to enhance the retention of volatile flavor and odor components, and it is especially applicable to those foodstuffs which are in the liquid state or which consist of solids dispersed throughout a continuous liquid phase.

Freeze-drying is a process of desiccation whereby the water is removed by sublimation from the solid state, that is from the frozen condition. Although this process is technically possible in air at atmospheric pressure, it is customary to eliminate air diffusional resistance, and thereby to obtain much faster rates of drying, by carrying out the process in a vacuum chamber where the absolute pressure is approximately the vapor pressure of ice at the desired temperature of operation.

One advantage of freeze-drying is the ease of reconstitution when the product is treated with water. This factor, along with the absence of heat damage because of the low temperature of drying accounts, for the historical use of freeze-drying for many pharmaceutical products such as blood plasma and antibiotics; and also explains the historical name of lyophilization for this process. For materials which are originally in liquid form, such as those pharmaceuticals, and many foodstuffs, ease of reconstitution is manifested by easy dispersibility and solubility. For originally solid materials, such as many other foodstuffs, it is manifested by quickness of rehydration. In this case it is associated with another advantage of this process; namely, retention of original form and texture and the absence of shrinkage, case hardening and heat denaturation of protein. A further advantage of freeze-drying is a very high level of retention of volatile components. For foodstuffs, this retention is of flavor and odor components thereby providing a big advantage in quality over other methods of drying.

It is well known in the industry that to varying extents these advantages are not realized in freeze-drying unless the materials are prefrozen before subjection to the vacuum of the drying chamber. It is not so widely recognized, but has been demonstrated by some investigators, that certain low temperatures, which vary with different products, must not be exceeded during the drying operation for good results, particularly for excellent retention of flavor and odor; and that for best results, the prefreezing should reduce the temperature of the material to be dried to the desired processing temperature before the frozen material is subjected to the vacuum of the process.

Present conventional freeze dryers typically consist of box-shaped cabinets, and the material to be freeze-dried is frozen on trays which are placed on shelves within the cabinet. In its simplest form this is a batch operation and requires considerable labor for the handling of trays. Semicontinuous operation could be achieved by operating a number of cabinets cyclically or by joining cabinets together in a large unit in which case the trays would be placed on racks intermittently introduced and removed through air locks. Although such modifications would make more efficient use of refrigeration and vacuum equipment, they would not have the typical advantage of continuous equipment such as minimum labor requirements, ease of automatic control, uniformity of operating variables, uniformity of products, etc. A truly continuous process, such as by handling the material on a moving belt, would be a big improvement.

As a matter of fact, continuous vacuum drying equipment has been built and has been used commercially for drying at temperatures above the freezing point. It typically comprises a straight, flat, continuous belt (for supporting and conveying the material during drying) that reverses direction by passing over a drum or roll at each end and is contained within a vacuum chamber. This equipment has not been used successfully for freeze-drying because of the lack of a satisfactory feeding method. As previously indicated, the feed must be frozen before exposure to the vacuum of the chamber in order to minimize volatile flavor losses. Furthermore, for liquid feeds, prefreezing eliminates foaming which interferes with subsequent heat transfer. Prior to the procedure of the present invention, these problems had not been solved.

The primary object of my invention is to feed material continuously to a freeze dryer and, moreover, to prefreeze the material to the desired operating temperature before exposure of the material to the vacuum of the chamber.

A further object is to positively exclude air from entering the vacuum chamber when the feed material is liquid. A similar object is to minimize air introduction when the feed material is solid.

Another object to eliminate the undesirable foaming which occurs when liquid feeds are introduced unfrozen. Still another object is to enhance the retention of volatile flavor and odor components of foodstuffs. Finally, it is a further object to provide intimate contact of the frozen feed material with the belt or other continuous surface, for better subsequent heat transfer.

In accordance with this invention the liquid feed material is introduced through an extended flat housing disposed along a short portion of the top of the dryer belt or other continuous surface forming therewith a freezing chamber. The feed is frozen on the belt or surface while in the housing and before being subjected to the vacuum of the vacuum chamber, even though the belt upon which it is deposited is contained within the vacuum chamber. Refrigeration means are positioned beneath the belt and opposing the extended flat housing. The housing is provided with top and three sides, but no bottom. However, in use, it is open only at the end toward which the belt is traveling because the three sides are in a sliding seal contact with the belt.

The liquid feed is frozen prior to emerging through the open end of the housing, at which point it acts as a pressure seal to prevent air or excess feed from entering the vacuum chamber. An added advantage of this invention is that the feed material has intimate contact with the belt by being frozen to it and will thus have better heat transfer characteristics in the subsequent drying.

This invention will now be described in more detail in connection with the accompanying drawings which are intended to be illustrative rather than limiting and in which.

Figure 1:
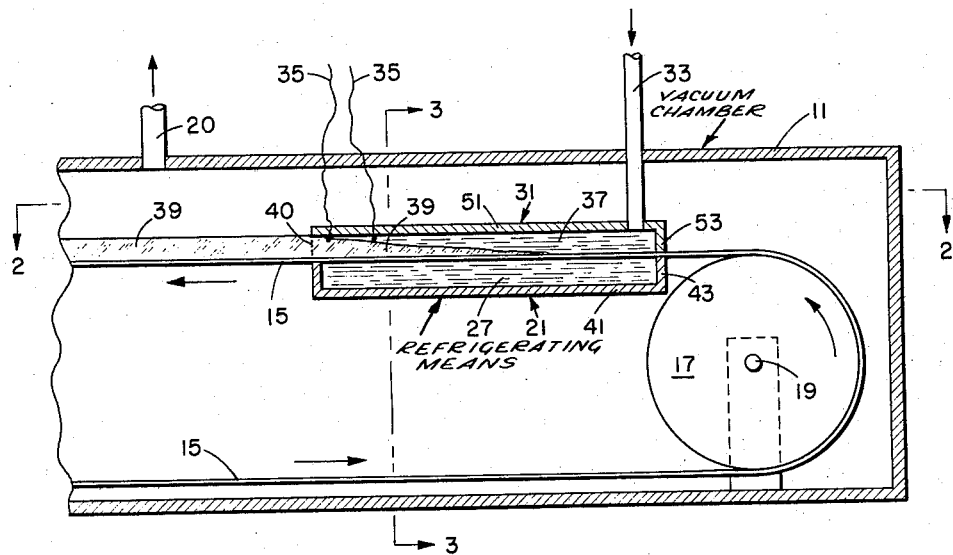
FIG. 1 represents a side view partly in section of the apparatus of this invention.
Figure 2:
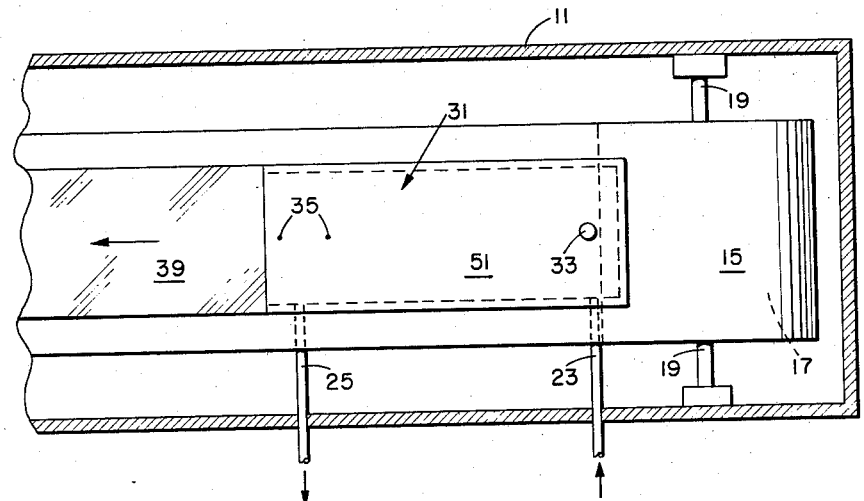
FIG. 2 represents a top view of interior of the apparatus taken along line 2—2 of FIG. 1.
Figure 3:
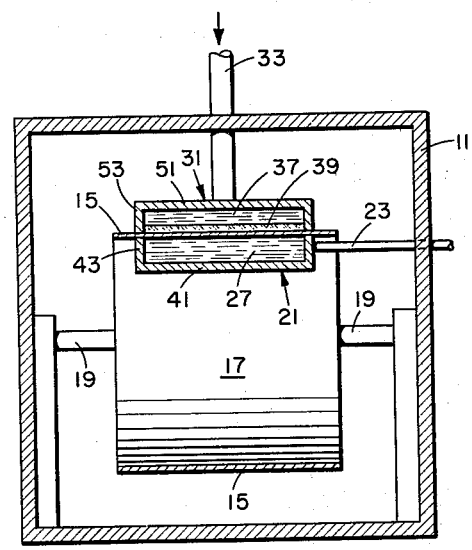
FIG. 3 represents an end sectional view of the apparatus taken along line 3—3 of FIG. 1.
Figure 4:
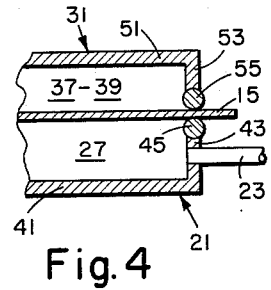
FIGS. 4, 5 and 6 show sectional details of various arrangements and modifications of the housing and refrigerating means.
Figure 5:
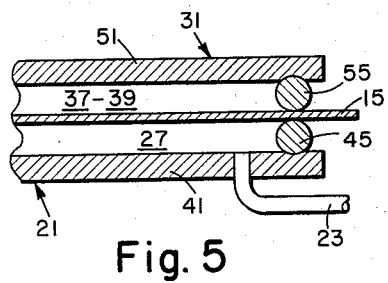
Figure 6:
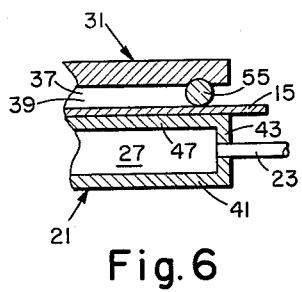

Vacuum chamber 11 is provided with a continuous belt (or equivalent continuous surface) 15 moving over roll 17 which is mounted on axes 19 and driven in any appropriate manner. The belt is of good heat conductivity, e.g. of aluminum or stainless steel. A similar roll (not shown) is located at the other end of the chamber, together with any suitable means such as a scraper blade for removing the dried product. This dried product may be taken out of the vacuum chamber through any suitable air locks. Adjacent the end of the belt near roll 17 is located refrigerating means shown generally by the numeral 21. This is provided with inlet 23 and outlet 25 for introducing and removing refrigerating fluid 27. On the opposite side of belt 15 is the extended flat housing generally represented by the numeral 31, and forming with belt 15 a freezing chamber. This housing is fed through conduit 33 projecting through the wall of the vacuum chamber 11. Thermocouples 35—35 may be provided if desired at appropriate places along the top of housing 31. The feed enters in the form of liquid 37 and becomes frozen as it travels along the belt and through the housing toward the exit end 40 thereof. This frozen product is represented by the numeral 39. The refrigerating means 21 consists generally of a bottom plate 41 and sides 43 which confine the refrigerating fluid 27 against the bottom of the belt 15. The sides 43 may be provided with low-friction edges 45 (FIGS. 4 and 5). These low-friction edges, as shown in FIG. 5, may constitute the entire side wall of the refrigerating means 21. Alternatively the refrigerating means 21 may be entirely enclosed as shown in FIG. 6. Such a refrigerating means would have a top plate 47 attached to walls 43 all around.

The housing 31 consists of a top plate 51 and sides 53 which extend all around except at exit end 40. As in the case of the refrigerating means, these sides may have low friction edges 55 which may constitute part of the sides as shown in FIG. 4 or the entire sides as shown in FIGS. 5 and 6. The top 51 may be made of transparent material in order to observe the progress of the liquid and frozen product through the housing; however this is not necessary and the thermocouples 35 can be used instead to determine the condition of the feed material as it progresses through the housing.

It is obviously important that the sides of the housing should fit tightly against the belt, in order to prevent escape of liquid or gases into the vacuum chamber. The placement of the refrigerating means 21 directly opposite the housing 31, as shown, is a preferred method of accomplishing this result. The low-friction edges 45 and 55 may be made of polytetrafluoroethylene or similar low-friction materials. The feed liquid may be precooled, even to slush form, prior to introduction through feed conduit 33. It may also be under partial vacuum, but insufficient to effect any substantial evaporation of the water phase. The housing 31 must obviously be long enough and the refrigerating means 21 adequate, to effect freezing of the liquid feed before it reaches the end 40 of the housing. At that point the frozen feed 39 will fill the end of the housing and effectively block any escape of liquid or gas from within the housing out into the vacuum chamber.

Any suitable refrigerating arrangement may be used for refrigerating means 21 as long as it accomplishes the desired purpose. However, the arrangements here described have been found particularly effective for the purpose.

Although this invention is especially useful for the freeze-drying of liquids such as orange juice, tomato paste, etc., it may be used for other foodstuffs containing more or less discrete pieces of solids in a continuous liquid medium which by freezing causes the seal at the exit end 40 of the housing to be sufficiently well maintained. Solids can also be handled in this apparatus even if no separate liquid phase is present, as long as the solids can be pressed or mashed or otherwise conformed into a body of material passing through the end 40 of the housing 31 in a substantially continuous sheet without appreciable holes or crevices through which air can pass from within housing 31 into the interior of the vacuum chamber 11. Peas are an example of such solids.

I claim:

1. Apparatus for freeze-drying comprising a vacuum chamber, a moving refrigerating surface therein, cooling means for refrigerating said surface, an elongated housing within said vacuum chamber through which said refrigerating surface passes and forming therewith a freezing chamber which is open at the end toward which said refrigerating surface is traveling, and open at the other end sufficiently for the passage of said refrigerating surface, and having a feed opening adjacent said other end of said housing for receiving a material to be freeze-dried; means for introducing said material from a point outside said vacuum chamber into said freezing chamber through said feed opening in an amount sufficient to keep said freezing chamber filled, the refrigerating effect causing said material to become completely frozen on the moving surface while traveling through said freezing chamber, thus forming a gas seal between said vacuum chamber and said freezing chamber, said vacuum chamber causing drying of said material after it has been frozen and has left said freezing chamber.

2. Apparatus according to claim 1, wherein said elongated housing is rectangular, with its top parallel to said refrigerating surface, and with two sides and the end from which said surface approaches being closed and in contact with said surface.

3. Apparatus according to claim 2, wherein said two sides and said end are provided with low-friction edges in contact with said surface.

4. Apparatus according to claim 1 wherein said cooling means comprises a closed refrigeration-containing chamber, one face of which consists of said belt.

5. Apparatus according to claim 1 wherein said refrigeration-supplying means and said housing are substantially coextensive in position on opposite sides of said belt.

References Cited by the Examiner

UNITED STATES PATENTS

| | | | |
|---|---|---|---|
| 2,533,125 | 12/1950 | Levinson | 34—5 |
| 2,561,437 | 7/1951 | Cobb | 62—138 |
| 2,602,304 | 7/1952 | Randell | 62—345 |
| 2,751,687 | 6/1956 | Colton | 34—5 |
| 2,864,243 | 12/1958 | Berger | 62—345 |

PERCY L. PATRICK, *Primary Examiner.*

NORMAN YUDKOFF, *Examiner.*